Sept. 23, 1941. C. E. MEYERHOEFER 2,256,987
HEAT EXCHANGE SYSTEM AND APPARATUS
Filed Sept. 23, 1938 5 Sheets-Sheet 3
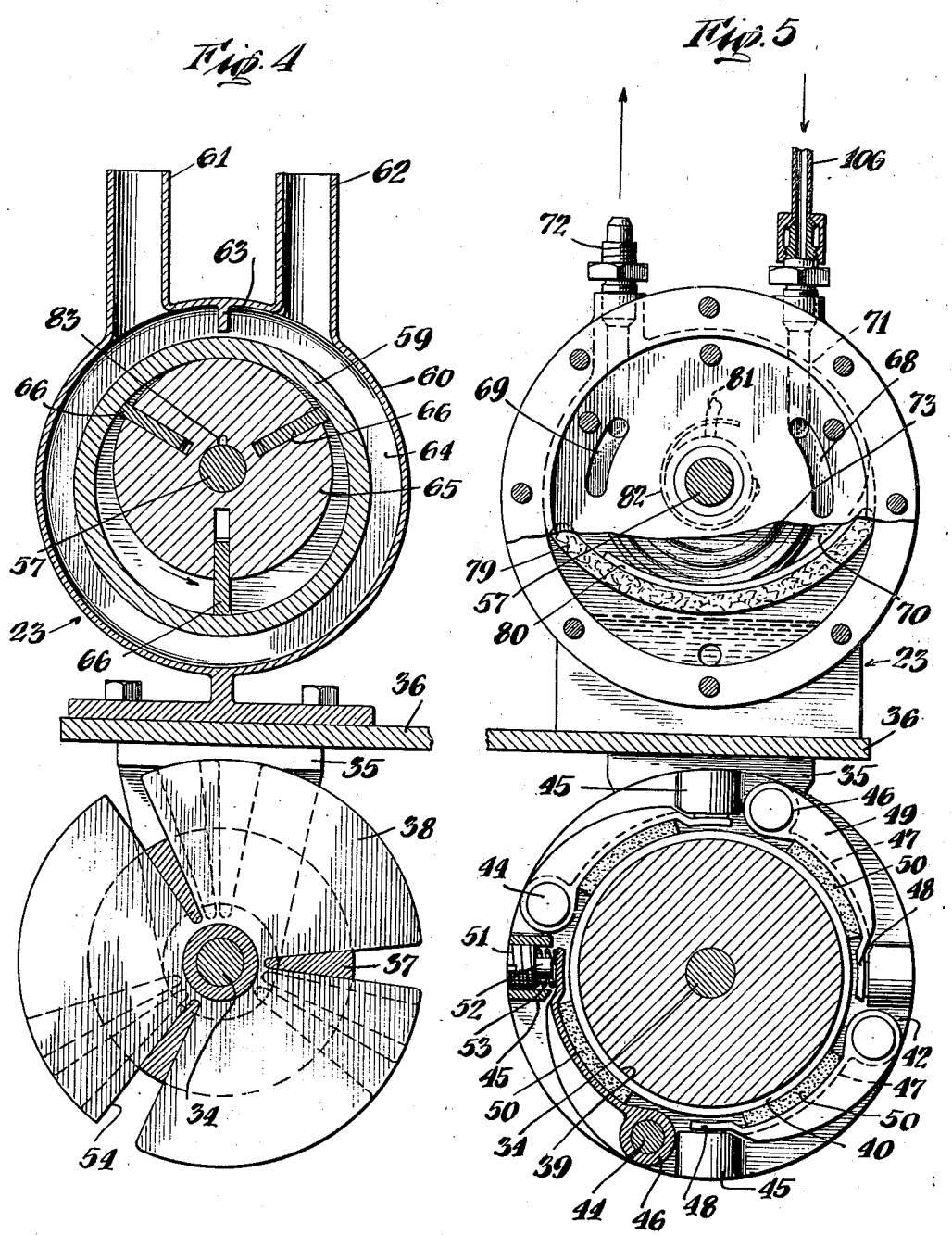
INVENTOR
Carl E. Meyerhoefer
BY
Duell Kane & Smoot
ATTORNEYS Sept. 23, 1941.  C. E. MEYERHOEFER  2,256,987
HEAT EXCHANGE SYSTEM AND APPARATUS
Filed Sept. 23, 1938  5 Sheets-Sheet 4
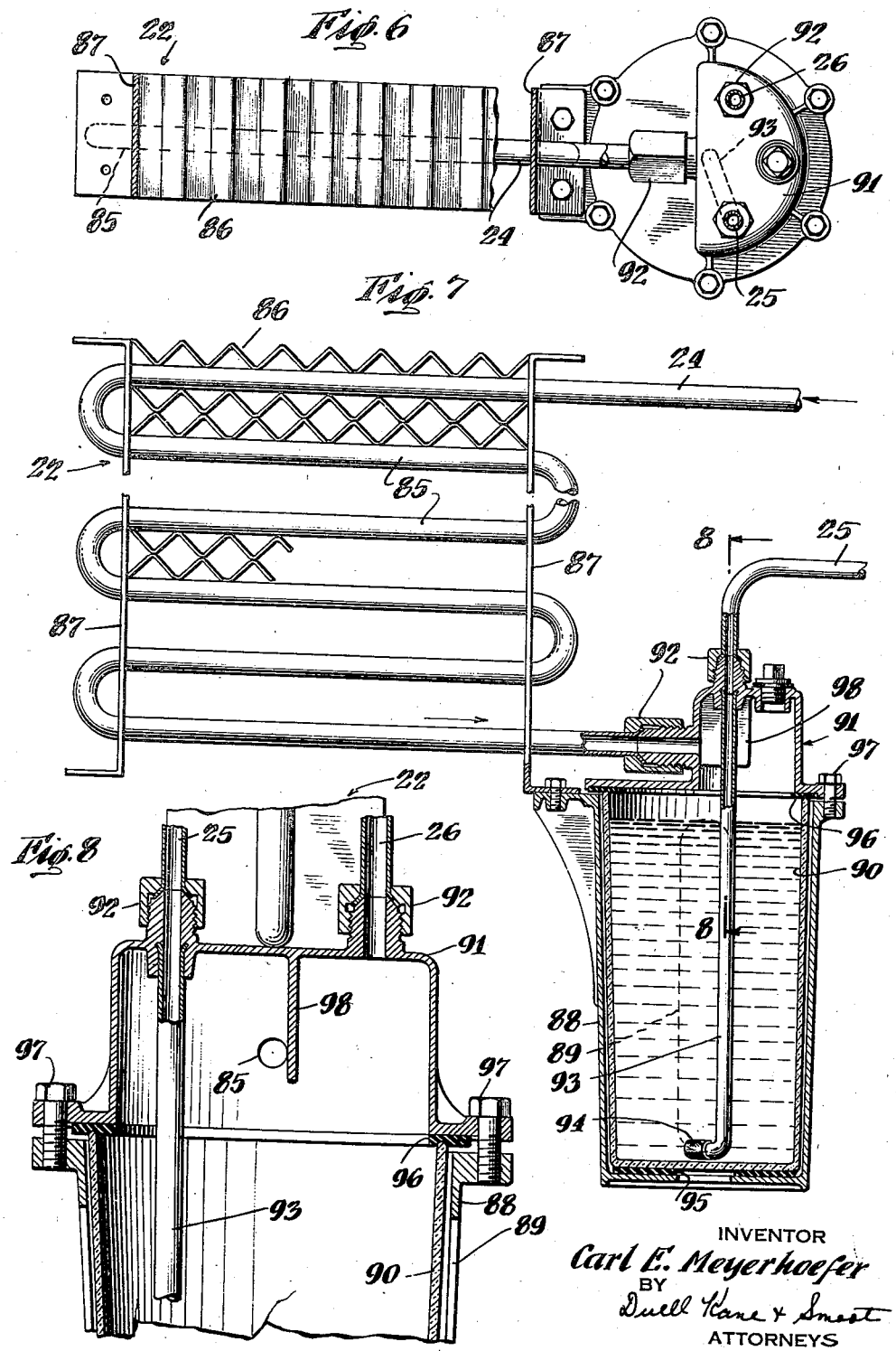
INVENTOR
Carl E. Meyerhoefer
BY
Duell Kane & Smut
ATTORNEYS Sept. 23, 1941.  C. E. MEYERHOEFER  2,256,987
HEAT EXCHANGE SYSTEM AND APPARATUS
Filed Sept. 23, 1938    5 Sheets-Sheet 5
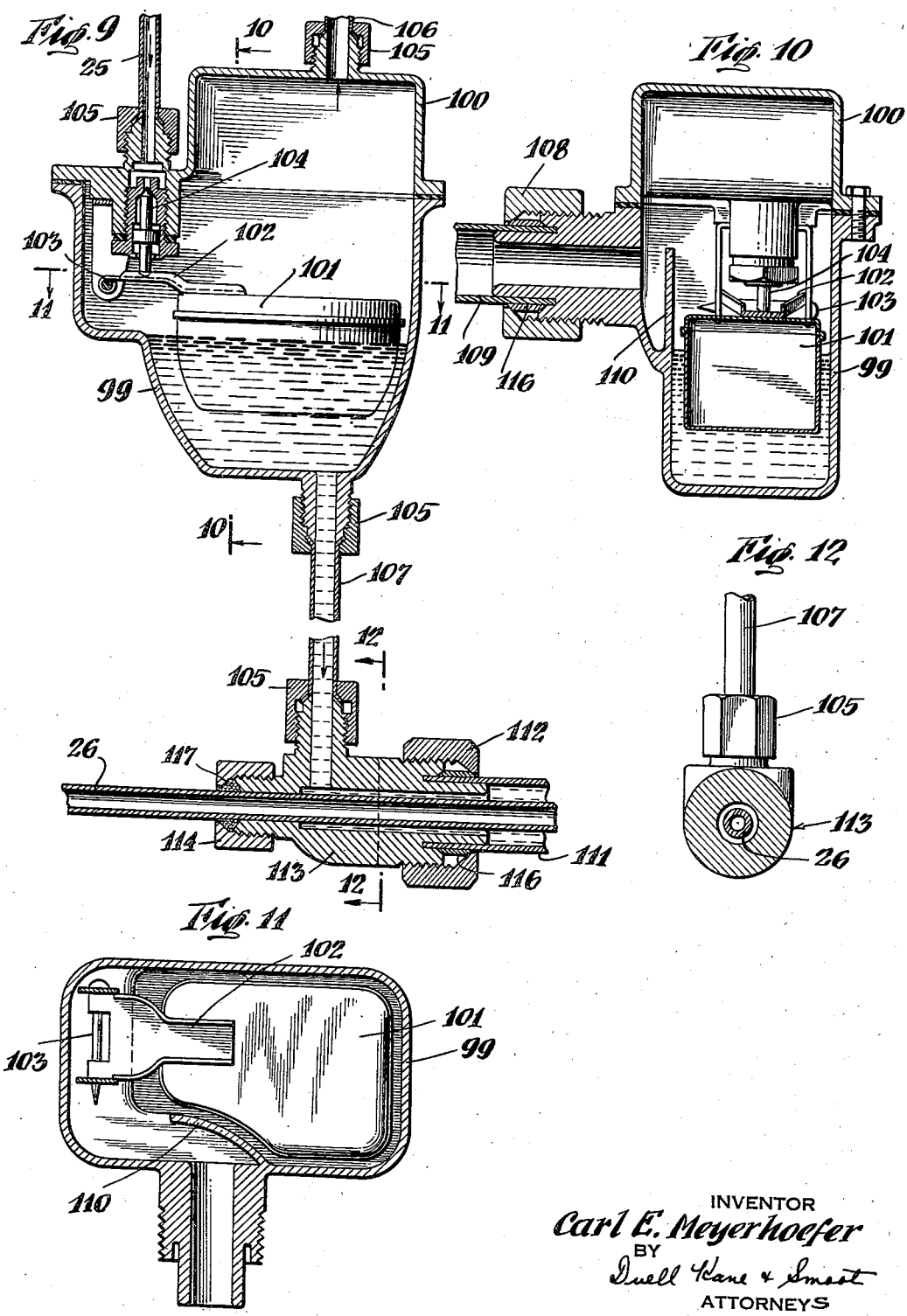
INVENTOR
Carl E. Meyerhoefer
BY
Duell Kane & Smeet
ATTORNEYS Patented Sept. 23, 1941

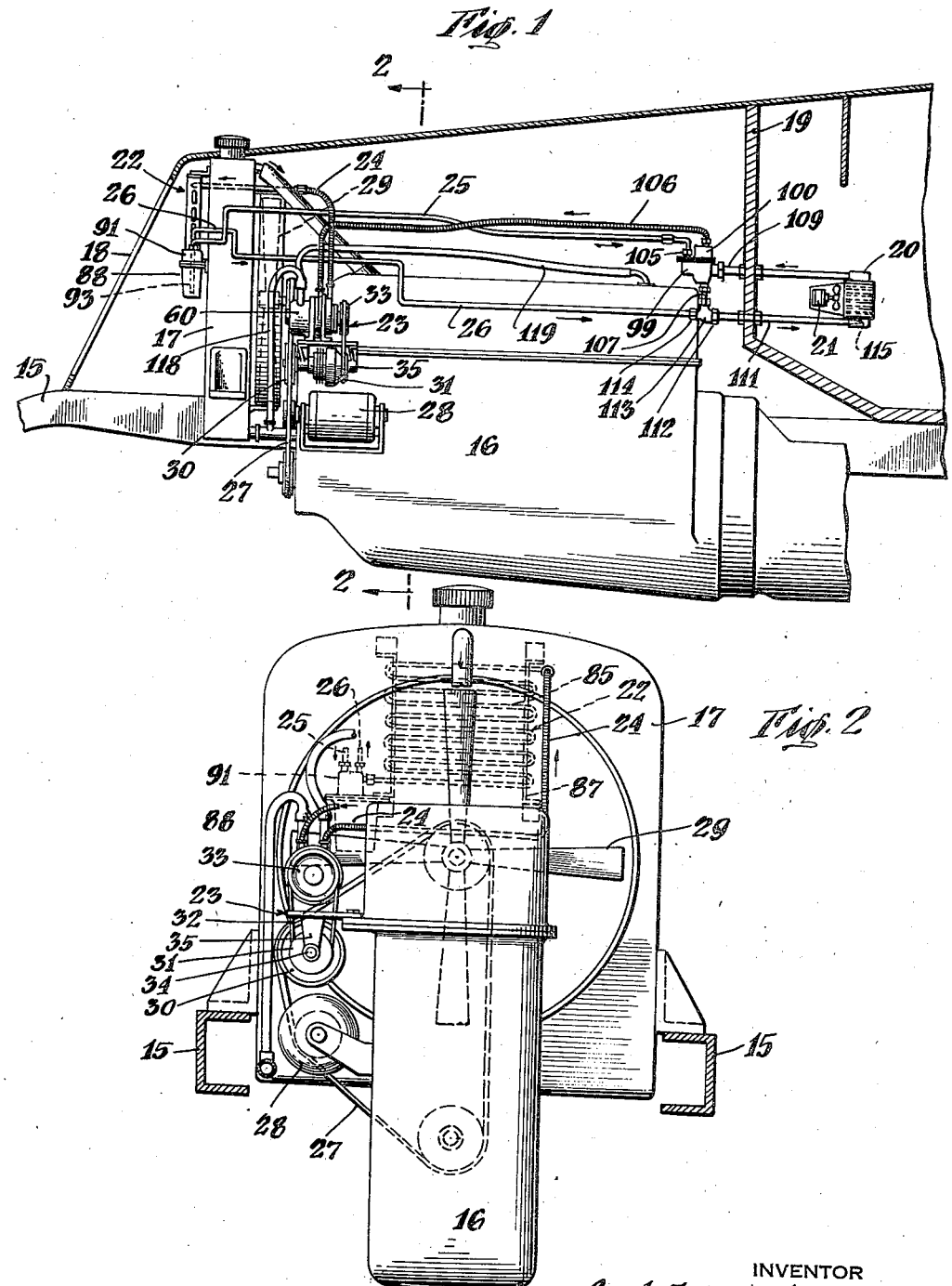

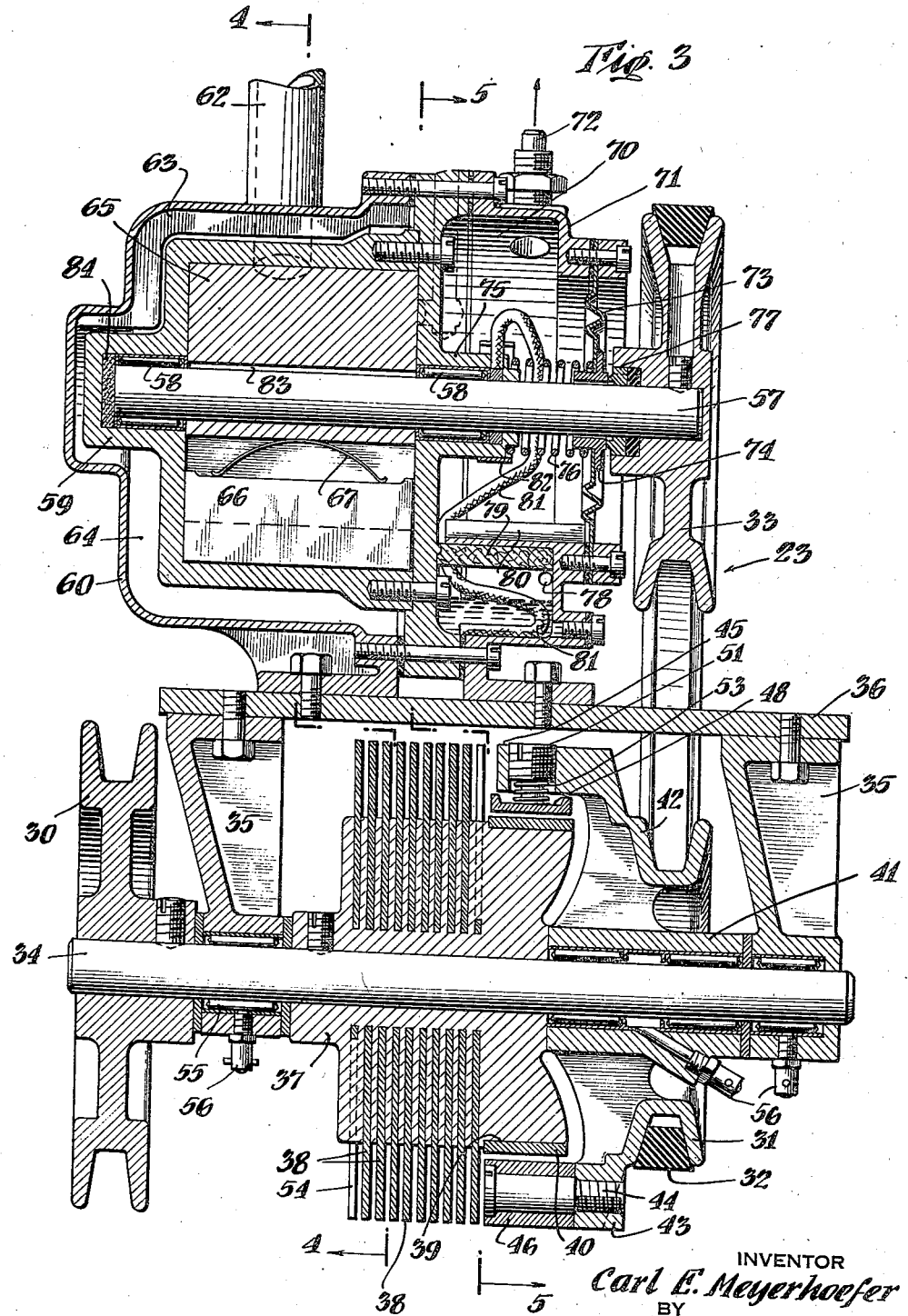

2,256,987

UNITED STATES PATENT OFFICE 2,256,987

HEAT EXCHANGE SYSTEM AND APPARATUS

Carl E. Meyerhoefer, Brooklyn, N. Y., assignor to E. A. Laboratories, Inc., Brooklyn, N. Y., a corporation of New York Application September 23, 1938, Serial No. 231,347

2 Claims. (Cl. 62—117)

This invention relates to a structurally and functionally improved heat exchange system as well as units embraced within the said system.

According to one specific and preferred aspect, it is an object of the invention to furnish units and a system of the type specified and particularly intended for application to vehicles such as automobiles for the primary purpose of cooling the same; it being understood, however, that the present invention has wide application for general cooling purposes and throughout the manifold types of installation where a system of such a character may be employed.

A further object is that of providing a system of this type which in certain respects will furnish improved structures and operating characteristics over the system as disclosed in my prior United States Patent 2,118,263 issued May 24, 1938, and entitled "Heat transfer apparatus;" the present invention being especially dedicated to the solution of problems of commercial manufacture, installation, and operation and such as existed in the apparatus disclosed in my prior patent.

A still further object is that of furnishing a system of this type the several units or parts of which may readily and economically be manufactured and assembled by quantity production methods so that the entire apparatus may be produced at a nominal figure.

Another object is that of producing an apparatus which may readily be installed in a motor vehicle as it is at present constructed, such installation requiring a minimum of effort and time and, when accomplished, moreover requiring minimum maintenance effort and expense and operating over long periods of time with freedom from all difficulties.

With these and other objects in mind, reference is had to the attached sheets of drawings illustrating one practical embodiment of the invention and in which:

Fig. 1 is a somewhat diagrammatic side view of the system installed in a motor vehicle;

Fig. 2 is a transverse sectional view taken along the line 2—2 and in the direction of the arrows as indicated in Fig. 1;

Fig. 3 is an enlarged sectional side view of the governor-pump unit which provides a unit of the system;

Figs. 4 and 5 are transverse sectional views taken along the lines 4—4 and 5—5 and in the direction of the arrows respectively indicated in Fig. 3;

Fig. 6 is a top plan view of the condenser-tank assembly;

Fig. 7 is a partly sectional side view thereof;

Fig. 8 is a fragmentary enlarged sectional view taken along the line 8—8 and in the direction of the arrows as indicated in Fig. 7;

Fig. 9 is a sectional side view of the control tank or chamber together with the parts with which it is directly associated;

Fig. 10 is a transverse sectional view taken along the line 10—10 and in the direction of the arrows as indicated in Fig. 9;

Fig. 11 is a sectional plan view taken along the line 11—11 and in the direction of the arrows as indicated in Fig. 9; and Fig. 12 is a transverse sectional view taken along the line 12—12 and in the direction of the arrows also indicated in Fig. 9.

As heretofore stated the present invention is primarily intended for use in connection with motor vehicles. However, it is capable of use in numerous other associations and except where otherwise indicated in the claims, the drawings and following descriptions are to be taken in an illustrative rather than in a limiting sense.

Thus, referring primarily to Figs. 1 and 2, the numeral 15 indicates the frame of the motor car mounting a motor 16 which is preferably water cooled and to this end has a radiator 17 connected to it by conventional hose portions or otherwise. In advance of this radiator and in accordance with present-day practise, a grill 18 may be disposed, and to the rear of the motor 16 a dash 19 may be provided, which forms a partition between the passenger and motor compartments of the vehicle.

Within the former compartment, a heat exchange structure or unit is disposed. This may take the form of a core 20 through the interstices of which air is impelled by means of a motor driven fan 21. The construction of a unit of this type is well known to those skilled in the art but it might be stated at the present time that the details of a desirable apparatus of this nature are shown, for example, in my prior United States Patent 2,087,160 of July 13, 1937, on a "Heater." This unit under cool weather conditions is coupled to the fluid circulating passages of the motor cooling system. In this manner fluid heated by the motor is circulated through the core 20 and returned to the cooling system and the interior of the vehicle is warmed by circulating air in contact with the surfaces of the core.

It is proposed to employ in the present invention this same heat exchange unit 20—21 for the purpose of cooling. To this end a condenser-tank assembly 22 may be arranged in advance of radiator 17 and to the rear of grill 18. This assembly will be herein described in detail, but at this time it will be observed that it is connected to a governor-pump assembly generally indicated at 23, and by means of a tube 24. Moreover the condenser-tank assembly has extending from it tubes 25 and 26, the purpose of which will be hereinafter brought out. It will also be noted that the governor-pump assembly may, according to the teachings of the present invention, be driven by the same belt 27 which serves to drive the conventional generator 28 and fan 29 positioned to the rear of radiator 17 and by means of which air is drawn through the latter.

Now, referring to the details of the governor-pump assembly, attention is primarily directed to Figs. 3, 4, and 5. In the first of these figures the numeral 30 indicates a drive wheel or pulley to be engaged by belt 27 and which serves—by means of a construction hereinafter described—to drive a pulley 31 engaged by a belt 32. The latter also passes around a pulley 33 so that when the motor 16 is operating the latter pulley revolves. At this time it will be understood that the foregoing is a form of drive ideally adapted for use in motor vehicles. It will be apparent, however, that instead of belts and pulleys any other form of drive might be employed.

Pulley 30 is secured to shaft 34 and the latter is rotatably supported by brackets 35 which may be secured to a mounting plate 36. Also secured to shaft 34 is a hub 37 with which heat radiating fins 38 are associated. This hub provides a mounting surface or flange portion 39 upon which a surface such as a layer or band of steel 40 is mounted. Loosely encircling shaft 34 is a sleeve 41 which is preferably integral with pulley member 31 or its equivalent. As shown in the figure under consideration as well as in the lower portion of Fig. 5, sleeve 41 is extended in the form of a disk shaped portion 42 which is formed with a series of abutments 43 at equally spaced points. Each of these abutments supports a stud 44, the outer ends of the latter overlying the band or layer 40. At points adjacent the abutments 43 the portion 42 is also provided with extensions 45. A plurality of levers corresponding in number to the number of pairs of abutments and extensions is employed and each of these levers preferably includes a stud-encircling end portion 46, a body 47 and an extended opposite end portion 48. It is moreover to be noted that each of the bodies of the levers may be U-shaped in section and thus be provided with side walls 49 so that these levers incorporate to a maximum extent resistance to distortion, it being moreover observed that each of the levers has its inner face longitudinally curved in the form of an arc corresponding to the degree of curvature of the band 40.

Secured to the inner faces of each of the lever bodies in any desired manner, is a layer of bearing material indicated at 50; such layers being preferably formed of brake lining or other similar material. Each of the extensions 45 is tapped so as to mount a threaded pin or screw 51 having an extended portion 52 encircled by a spring 53. The aggregate convolutions of the spring when compressed should occupy a space corresponding in height to the space of extension 52. These springs bear against the extended end portions 48 of the levers and it is thus obvious that the layers of material 50 are caused to intimately engage the surface of band 40 to normally prevent movement of the disk 42 and its associated parts with respect to the hub 39.

Although numerous different forms of construction may be resorted to in order to achieve the functional results desired, and although various technics may be employed in adjusting the parts, it is preferred that as shown, an operator—with the parts assembled—shall primarily tighten down or project the set screws 51 to a point at which the inner ends of extensions 52 intimately engage the free ends of the levers and project the latter inwardly. Thereafter by simply "backing-up" the set screws 51 to a certain degree, extended portions 52 no longer engage the free ends of the levers and the latter may be swung against the action of springs 53 to permit of a movement occurring between hub 37 and pulley 31 of its equivalent.

With the parts adjusted in the manner described it is obvious that the shaft may, for example, be rotated at 2,000 R. P. M. and pulley 31 will be similarly rotated. However, when shaft 34 exceeds this speed of rotation centrifugal force acting upon levers 49 will serve to swing the free ends of the latter around the studs 44 to thus release the contact pressure between layers 50 and band 40. It will be observed, however, that as soon as the speed of pulley 31 drops below 2,000 R. P. M. (if the parts are set with this thought in mind) levers 49 will again be swung inwardly incident to the action of springs 53 and this will continue in a series of intermittent grasping operations such, that the speed of the driven element 31 will be maintained at the desired velocity, regardless of how much the driving member may exceed this velocity. In this respect the governor will depart completely from the characteristics of a slipping-clutch; it being, of course, understood that at speeds below those predetermined, the driving and driven portions will rotate as one unit.

It is of course obvious that the fins 38 or their equivalents will serve to dissipate heat generated incident to the aforedescribed intermittent coupling of the parts and which may of course continue over long periods of time. Also it will be understood that according to the preferred embodiment of the invention, hub 37 will be formed of die-cast material while fins 38 should be formed of a metal having higher heat dissipating characteristics than that of a metal of such composition. It is intended to assemble the fins in the die at the time of formation of the hub 37 and in order that the parts may be secured against the possibility of displacement, it is intended that the fin members be formed with inwardly extending slots 54 through which the die-cast metal may key. In order to avoid any weakness being included in the hub member, the slots in adjacent disks or fins are off-set with respect to each other as is especially shown in the lower portion of Fig. 4. Also incident to this construction a fan effect is created so that a better heat exchange structure is provided between the fins and the air moving in contact with them. Finally, with respect to the governor unit, it will be noted that anti-friction bearings 55 may be provided for example between the extensions 35 and shaft 34 as well as between sleeve 41 and this shaft, these bearings being conveniently lubricated through more or less standard fittings 56. Also, it will be understood from a review of the foregoing that a unit is provided which will serve to drive a pump connected thereto up to certain predetermined speeds but not beyond the same, it being finally noted that this governor per se provides the subject matter of the invention embraced in my prior United States application filed September 3, 1938, and identified under Serial No. 228,463. According to the present invention this governor is to drive a pump including, as shown, a shaft 57 to which driving member 33 is secured and which shaft may be conveniently anti-frictionally supported by bearings 58 mounted by a casing 59. This casing is enclosed in a jacket 60 from which tubes 61 and 62 extend for a purpose hereinafter brought out, it being observed that the casing and jacket are concentrically disposed with respect to each other and that a baffle or partition 63 may serve to divide the space 64 between the same. The jacket 60 is conveniently supported by the same plate 36 which supports the governor. A rotor 65 is eccentrically disposed within casing 59 and is formed with a plurality of radially extending slots within each of which a blade 66 is disposed. Preferably each of these blades is impelled outwardly by a relatively weak spring 67, the resistance offered by this element being not materially in excess of that necessary to cause blades 66 to constantly engage with their outer edges the inner face of casing 59.

The side wall of casing 59 is formed with an inlet port 68 and an outlet port 69; the rotor 65 turning in a clock-wise direction as viewed in Fig. 5. Accordingly, fluid may be drawn through port 68 into the space between the vanes or blades 66, is compressed and discharged through port 69. Port 69 communicates with a compartment 70 provided by a casing 71 affixed to casing 59 and jacket 60, and from this compartment a tube 72 extends and is coupled to tube 24. The outer face of housing 71 is preferably closed by a flexible diaphragm 73 which carries a collar 74. Casing 59 is formed with a hub portion 75 against which one end of spring 76 bears, the opposite end of this spring thrusting against collar 74 to force the same into contact with a packing ring 77 preferably formed of carbon and functioning as a seal to isolate the interior of compartment 70 from the outer atmosphere. The packing ring 77 may conveniently be disposed within the recessed hub of pulley 33 and it is apparent that a fluid-tight seal will at all times be provided at this point first incident to the action of spring 76 and secondly due to the fact that under pressure conditions within compartment 70, diaphragm 73, will flex outwardly to render the seal operative to a greater extent than would otherwise be the case.

This pump is according to the present invention intended primarily for use with a refrigerant and it is of course to be understood that the ordinary refrigerant will not embody lubricating characteristics. Therefore, the parts of the pump must be otherwise lubricated, and at the same time care must be exercised to assure that the refrigerant is not diluted with lubricant and at points in the system where this would detrimentally affect the functioning of the apparatus.

With this in mind it will be observed that the lower portion of housing 71 provides a sump which may be filled with a body of lubricant through a passage 78, it being noted that this passage preferably defines the upper level to which oil may rise within the sump so that an over-filling of the latter is prevented. Supported in the upper zone of this portion is a filtering pad 79 which underlies a curved plate 80 extending within compartment 70. A wick 81 has its lower end immersed in the oil within the sump, its upper end passing through an opening in a slotted spring 82 mounted by hub portion 75. The opening of this spring should preferably be less than the normal diameter of wick 81 so that the latter is firmly grasped and the tendency of the spring should be such that the inner end of the wick is constantly pressed toward the axis of ring 77.

It is obvious that oil will be drawn by capillary attraction upwardly through the wick 81 and will be deposited within the bearing housed by hub 75. It will also move through a passage 83 formed through the rotor 65 so that it will reach the bearing 58 adjacent the inner end of shaft 57 and at which point a lubricating pad 84 may be disposed so as to assure an adequate reserve of lubricant. It will, of course, be understood that passage 83 might, if desired, contain any suitable material such as a wick to induce—by capillary action—the flow through the same towards the pad 84. While of course the pump will, to the greatest extent, draw only the liquid which is to be compressed through the casing 59, it is inevitable that as a consequence of lubricating the parts a certain amount of oil will be discharged through outlet 69 into the interior of compartment 70. This oil will deposit itself against the walls defining the compartment but incident to the high turbulence within this space a certain amount would inevitably follow the course of main fluid and be drawn outwardly through tube 72. To avoid this, plate 80 is provided, it being especially observed in connection with the parts which are disclosed, incident to the breaking away of the over-lying parts, that oil in its passage through chamber or compartment 70 will follow along the body of the plate and then over the edge of the same where it will be deposited upon filter pad 79 and so move into the sump. This operation is indefinitely repeated and it is obvious that by means of the construction described adequate lubrication is assured.

Now referring to the condenser-tank assembly, attention is directed especially to Figs. 6, 7 and 8 in which it will be seen that tube 24 is continued in the form of a serpentine tube or pipe 85, between the courses of which heat dissipating fins 86 or their equivalents, may be deposited. This entire structure may be supported by end plates or straps 87 and it will of course be understood that while a unit of this general character is preferred, virtually any desired type of condenser may be employed.

The lower end of tube 85 is coupled to a tank or refrigerant receiver. This may include a casing 88 conveniently formed of metal and provided with openings 89. The casing receives a container 90 conveniently formed of glass and the height of which may be slightly in excess of the height of the casing, although the diameter of the same should be slightly less than the corresponding casing diameter. The upper end of casing 88 is closed by a cap member 91 also conveniently formed of metal and provided with fittings 92 to which the ends of tubes 85 and 25 respectively may be secured. The uppermost of the fittings 92 continues in the form of a pipe 93 downwardly within casing 88 and a strainer 94 may be secured to this lower end and extend angularly adjacent the base of receptacle 90. A gasket 95 may be interposed between the adjacent faces of the base portions of the receptacle encasing, and a gasket 96 may be interposed between the edge of receptacle 90 and the flange of cap member 91. This cap member is drawn firmly towards casing 88 by means of bolts 97 or by any other functionally equivalent structure. Suffice it to say that while incident to this difference in diameter of the casing receptacle, no damage will occur to the latter, because of the differential expansion factor an air-tight seal will be furnished between the receptacle and the cap, and the former will be cushioned against shocks.

It will be additionally noted that cap member 91 is furnished with an outlet to which tube 26 is coupled and that a baffle 98 preferably extends between the inner end of tube 85 or the fitting 92 therefor, and the fitting which couples pipe 26 to the cap member. In this fashion it is obvious that if particles of liquid should be discharged from pipe 85 they will not be withdrawn through tube 26. Rather, they will strike against baffle 98 and be diverted downwardly into the body of liquid within receptacle 90. Moreover incident to the provision of openings 89 the height of the liquid within the receptacle may at all times be observed so that an operator may be aware of when this liquid requires replenishing.

In a system of this character a control should be provided to adequately maintain the proper level of the liquid and the flow of fluids. Such a control has been shown in Figs. 9, 10, 11 and 12, to which attention is now primarily directed. In these views the numeral 99 indicates the base of a casing to which a cover portion 100 is applied. This casing provides in effect a float chamber within which a float 101 is disposed and connected by an arm 102 to a fulcrum 103 as well as a valve stem 104 to control the admission of fluid through tube 25. This tube is of course connected to the cover 100 by a suitable fitting 105, a similar fitting being employed coupling the cover to a tube 106 which has its opposite end connected to port 68 of the pump. By means of a similar fitting the bottom of casing 99 may be connected to a tube 107. A fitting 108 may couple the side wall of casing 99 with a tube 109 and adjacent the end of which a baffle or partition 110 is deposited within casing 99.

Tube 109 is connected to the upper head or section of core 20 and a tube 111 couples the lower portion of this core with a fitting 112 forming a part of a unit 113. The latter by means of a fitting such as 105 is connected to the lower end of tube 107 and by a fitting 114 is secured to the pipe 26, the latter extending entirely through body 113 and is continued through tube 111 and preferably terminates in a nozzle 115 within the lower head or portion of core 20. It will also be observed that the bore of body 113 and to which tube 111 is coupled, is of an area such that space exists between it and the outer face of pipe 26 so that direct communication is afforded between tubes 111 and 107.

While of course the fittings or couplings 108, 112, and 114 may include any desired structure, it is preferred that the first two embrace a metallic packing ring 116 while fitting 114 should preferably embrace an asbestos-graphite packing 117. Such packings will assure a substantially gastight fit between the several parts and under conditions of vacuum or pressure. In installing the system the condenser-tank assembly generally indicated at 22 is disposed in advance of the radiator and in the path of travel of the air drawn through the same by the fan 29. The various pipes 24, 25, and 26 are coupled to this assembly and it will of course be understood that the straps or side pieces 87 may be secured to the main radiator 17 in any convenient fashion. The mounting plate may likewise be coupled to the motor 16 by, for example, the bolts which secure the head of the latter in position. Thereupon, belt 27 is passed over pulley 30 so that the governor-pump unit may be properly driven. This unit is of course coupled to pipes 24 and 106, and additionally the tubes 61 and 62 are coupled by conduits 118 and 119 to the cooling system of the motor. In this manner fluid circulates around the pump casing 59 to maintain the latter below any critical temperature. The control unit is coupled to tubes 106, 25, and 26 in addition to tubes 109 and 111.

The latter may of course form fixed portions of the heat transfer unit 20, and it will be understood that this unit is preferably of such type that it may be used with equal facility to heat the interior of the vehicle in winter as well as to cool the same in summer. Normally tubes 109 and 111 will afford sufficient support for the control member including the float chamber, but if it is desired to additionally support this unit, a bracket or otherwise suitable structure may be provided. Care should be used to see that the nozzle or reduced end portion 114 of pipe 26 extends within or adjacent the lower end of the core, as taught in my patent afore identified.

The end of passage 78 is now unsealed and the sump of the pump is filled with oil until the level of the latter is such that it will receive no further quantity of lubricant. Receptacle 90 is filled with refrigerant and motor 16 is operated to cause the system to function. In such functioning it is apparent that the pump will exert sufficient pressure through pipe 24 and suction through pipe 106 to cause the refrigerant to be withdrawn through pipe 93 and thence through pipe 25. Through the latter it will be discharged into the float chamber which includes casing 99 and for the reason that no fluid will be within the latter it will flow freely through tube 107, the bore of unit 113, and tube 111 into the heat transfer unit 20. This will exhaust the liquid within receptacle 90; it being of course understood that if desired the latter might be made sufficiently large so that this would not be the case, or if this receptacle were relatively small, several fillings of the latter might be required to "charge" the control and heat transfer portions of the system.

Now, by again filling receptacle 90 after interrupting operation of the pump unit, the system—under normal conditions—should be ready for operation. It will of course be understood that minor adjustments may be made and that under all circumstances it would probably be preferable to adjust the levers 47 so as to assure a proper grasping contact between the layers 50 and band 40.

Various types of refrigerant may be employed in a system of this character but I prefer to utilize methylene chloride, commonly known as "Carrene" ($CH_2Cl_2$). This refrigerant has a boiling point of approximately 103.5° F. under ordinary atmospheric pressures. When confined to a chamber at less than atmospheric pressure, the boiling point may be materially lowered, and by permitting air to flow through the liquid so confined, the evaporating process is accelerated and thus occurs at an even lower temperature, while if the structure is such that one in effect achieves a "dense air" refrigerating system within the evaporator, the temperature of the liquid is still further lowered. This has been adequately traversed in my prior United States Patent No. 2,118,263 to which reference is had for a fuller explanation. Summarized, it may be stated however that by utilizing a refrigerant having the characteristics of the type referred to, it is feasible to achieve within the core 20 temperatures of from 45° F. to 50° F. without resorting to conditions of either excessive pressure of vacuum, and it has been found that if unit 20 is of adequate capacity, these temperatures are sufficient to maintain a comfortable condition within an enclosure, such as the body of an automobile. Of course, with refrigerants having lower boiling points, even lower temperatures might be maintained, and by slightly increasing the vacuum conditions created by the pump unit, it would again be feasible to lower the temperature. It is preferred, however, not to employ a refrigerant having a lower boiling point because of the difficulty in "charging" the system and the danger that the greatest part of the refrigerant would be vaporized. Aside from the fact that if the temperatures are too low the evaporator (core 20) will—in operation—build up frost which would be objectionable.

With the system installed and filled as specified it will be appreciated that the motor 16 will cause operation of the governor-pump unit 23 and will additionally cool the latter by means of the water circulating pipes 61 and 62. The level of the refrigerant within the core will be maintained by the float controlled valve 104 and this refrigerant will also fill tubes 107 and 111. Incident to the suction exerted, air will be drawn through pipe 26 and will bubble up through the body of fluid within the core 20, it being noted that an expansion valve effect will be achieved incident to the nozzle 115 or its equivalent, and that within tube 109 a condition of vacuum will be present. Such a condition will of course be transmitted to the upper header or portion of core 20. The vacuum moreover will exist within the casing 99 by virtue of pipe 106.

Saturated vapor will flow through pipe 109 to the float chamber and any entrained particles of liquid will strike against the baffle or partition 110 and be deposited within the liquid within the casing or chamber 99. The remaining vapor will flow to the pump and be subjected to a compressive action. While of course this compressive action is relative and might result in the vapor actually being subjected to less than atmospheric pressure, it is preferred that the vapor be actually compressed anywhere from five to fifteen pounds above atmospheric pressure, such vapor being discharged by the pump into the condenser.

Of course if pressures greater than atmospheric are resorted to, the boiling point of the liquid refrigerant will be raised. This will assist in the condensing action and will also be helpful where extreme conditions of outside temperature are being encountered. In any event, the refrigerant will flow from the end of pipe 85 into receptacle 90 and again any entrained particles of liquid will be prevented from directly flowing to tube 26 because of the baffle or partition 98. Consequently the liquid will accumulate within receptacle 90 to provide a reserve to replenish through pipes 93 and 25 the liquid within the float chamber, and should the level of the latter drop to a point at which the valve 104 will permit of such flow. The vapor passing through tube 26 is of course drawn from the tank section of the condenser-tank unit and this vapor will have the potentiality of evaporating a relatively large amount of liquid as it expands beyond the nozzle 115 and rises within the liquid contained within core 20.

It will of course be understood that when atmospheric conditions warrant it the heat transfer unit 20 may be uncoupled from the remainder of the system and the latter may be purged of refrigerant. Thereupon, by simply connecting the unit to the cooling system of the motor or otherwise, this unit will function to heat the interior of the space within which it is disposed. However, when the apparatus functions as a cooling system it will be appreciated that incident the provision of the governor, the pump will operate with maximum efficiency when the car is traveling under ordinary traffic conditions entailing road speeds of anywhere from zero miles per hour to twenty-five miles per hour. The figure of 2,000 R. P. M. on the part of the pump is purely arbitrary and according to the manner in which the apparatus is designed this figure might be lowered or raised and the drive from the motor to the pump might have its ratio varied. It has been assumed that the figure given will raise—in an ideal condition—the speed of the pump when the car in direct drive is moving forward at a speed of from twenty-five to thirty miles per hour. If this speed is exceeded the system will continue to function with maximum efficiency and the governor will maintain this operating condition even though an excessive speed is maintained by the car. The heat developed by both the governor and pump will also—as afore brought out—be efficiently dissipated.

Thus among others the several objects of the invention as specifically afore noted are achieved. As afore brought out the present invention has manifold applications and uses other than cooling the interior of a motor vehicle and it will be apparent that the structures heretofore described and illustrated might be modified in numerous particulars both in the illustrated embodiment of the invention as well as in other applications of the same and without departing from the scope of the claims.

Having described my invention, what I claim as new and desire to secure by Letters Patent is:

1. A heat exchange system adapted for installation in an automobile powered by a water-cooled internal combustion engine, said system comprising in combination condenser and evaporator units, a refrigerant for circulation therein, pump means coupled to said condenser and evaporator for circulating said refrigerant, said pump means being formed with a water-jacket for coupling in series to the water-jacket of said internal combustion engine whereby the water circulating in the latter will circulate as well in the former and thus cool said pump, clutch means controlled by the speed of said internal combustion engine to actuate said pump when said internal combustion engine is operating below pre-determined levels of speed, said clutch means being formed with heat-dissipating fins positioned axially on the exterior of the driving member thereof to cool the same during operation of the system and said fins being formed with a plurality of radial slots spaced about their peripheries.

2. A heat exchange system adapted for installation in an automobile powered by a water-cooled internal combustion engine, said system comprising in combination condenser and evaporator units, a refrigerant for circulation therein, pump means coupled to said condenser and evaporator for circulating said refrigerant, said pump means being formed with a water-jacket for coupling in series to the water-jacket of said internal combustion engine whereby the water circulating in the latter will circulate as well in the former and thus cool said pump, clutch means controlled by the speed of said internal combustion engine to actuate said pump when said internal combustion engine is operating below predetermined levels of speed, said clutch being formed with a plurality of heat-dissipating fins positioned axially on the exterior of the driving member thereof said fins being formed with radially extending slots and being so arranged that the slots in adjacent fins are in non-aligning relationship to one another, and said fins being further so arranged as to cause the passage of an air-stream across said clutch during operation thereof to effect a cooling of the parts.

CARL E. MEYERHOEFER.